(12) United States Patent
Tse

(10) Patent No.: US 7,139,370 B1
(45) Date of Patent: Nov. 21, 2006

(54) USING HYPERLINKS TO ESTABLISH CALL SESSIONS

(75) Inventor: Paul Chan H. Tse, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 636 days.

(21) Appl. No.: 09/652,166

(22) Filed: Aug. 31, 2000

(51) Int. Cl.
*H04M 11/00* (2006.01)

(52) U.S. Cl. ............................ 379/88.17; 379/93.17; 379/201.01

(58) Field of Classification Search ........... 379/216.01, 379/218.01, 352, 355.01, 355.03, 355.04, 379/355.08, 93.35; 370/352, 355
See application file for complete search history.

(56) References Cited

U.S. PATENT DOCUMENTS

| | | | | |
|---|---|---|---|---|
| 6,091,808 A | * | 7/2000 | Wood et al. | 379/201.04 |
| 6,134,319 A | * | 10/2000 | Burg et al. | 379/354 |
| 6,173,316 B1 | * | 1/2001 | De Boor et al. | 709/218 |
| 6,192,123 B1 | * | 2/2001 | Grunsted et al. | 379/350 |
| 6,212,506 B1 | * | 4/2001 | Shah et al. | 705/418 |
| 6,215,784 B1 | * | 4/2001 | Petras et al. | 370/356 |
| 6,310,873 B1 | * | 10/2001 | Rainis et al. | 370/356 |
| 6,337,858 B1 | * | 1/2002 | Petty et al. | 370/356 |
| 6,360,254 B1 | * | 3/2002 | Linden et al. | 709/219 |
| 6,389,124 B1 | * | 5/2002 | Schnarel et al. | 379/142.01 |
| 6,453,034 B1 | * | 9/2002 | Donovan et al. | 379/220.01 |
| 6,477,247 B1 | * | 11/2002 | Burg et al. | 379/354 |
| 6,526,129 B1 | * | 2/2003 | Beaton et al. | 379/90.01 |
| 6,553,515 B1 | * | 4/2003 | Gross et al. | 714/47 |
| 6,570,870 B1 | * | 5/2003 | Berstis | 370/352 |
| 6,628,644 B1 | * | 9/2003 | Nelson et al. | 370/352 |
| 2002/0041588 A1 | * | 4/2002 | Gleneck | 370/352 |
| 2003/0061354 A1 | * | 3/2003 | Burg et al. | 709/227 |
| 2004/0022235 A1 | * | 2/2004 | Vaziri et al. | 370/352 |
| 2005/0232173 A1 | * | 10/2005 | Gunasekar et al. | 370/282 |

OTHER PUBLICATIONS

T. Berners-Lee et al., Network Working Group Request for Comments: 1738, Uniform Resource Locators (URL), pp. 1-23 (Dec. 1994).
R. Fielding, Network Working Group Request for Comments: 1808, Relative Uniform Resource Locators, pp. 1-15 (Jun. 1995).
R. Fielding et al., Network Working Group Request for Comments: 2616, Hypertext Transfer Protocol—HTTP/1.1, pp. 1-162 (Jun. 1999).
M. Handley et al., Network Working Group Request for Comments: 2543, SIP: Session Initiation Protocol, pp. 1-134 (Mar. 1999).
Wireless Application Protocol Forum, Ltd., Wireless Application Protocol Architecture Specification, pp. 1-20 (Apr. 1998).
Webopedia Definition and Links, *Hypertext*, 1 page, printed from webopedia.internet.com website (Aug. 1998).

(Continued)

*Primary Examiner*—Ovidio Escalante
(74) *Attorney, Agent, or Firm*—Trop, Pruner & Hu, PC

(57) ABSTRACT

A communication system includes various terminals that are capable of establishing call sessions over a data network. Each of the terminals includes a display in which hyperlinks can be presented. User selection of the hyperlinks is communicated to one or more application routines, which generates requests based on information (e.g., uniform resource locators) associated with the selected hyperlinks. The requests cause generation of call requests over the data network to establish call sessions between terminals.

8 Claims, 7 Drawing Sheets

OTHER PUBLICATIONS

Webopedia Definition and Links, *Hyperlink*, 1 page, printed from webopedia.internet.com website (Jul. 1998).

Webcom Html Guide, *Hotlink Concepts*, pp. 1-2, printed from www.webcom.com website (1999).

Bill Mann, Does British Telecom Own Hyperlinking?, pp. 1-2, printed from www.fool.com website (Jun. 2000).

Tony Westbrook, What's with BT's Hyperlink Patent?, pp. 1-5, printed from www.zdnet.com website (Jun. 2000).

\* cited by examiner

USING HYPERLINKS TO ESTABLISH CALL SESSIONS

TECHNICAL FIELD

The invention relates to using hyperlinks to establish call sessions.

BACKGROUND

In making telephone calls in traditional telephony systems, users typically have to dial the number associated with the callee. Typically, such numbers are entered through a keypad of a telephone, or alternatively, by pressing a speed-dial button. With some telephones, such as mobile telephones, a telephone directory may be displayable in the display of the telephone. A user may select an entry from the displayed directory to dial the corresponding telephone number.

In addition to calls over traditional circuit-switched networks, improvements in the bandwidth and speed of data networks have also enabled telephony sessions to be established over packet-based data networks, such as local area networks (LANs), wide area networks (WANs), the Internet, and so forth. Traditional communications over data networks include electronic mail, web browsing, file transfer, and the like. To enable reliable voice and other forms of streaming communications over data networks, various technologies and protocols have been developed.

An example of a device that enables voice communications over data networks is a computer system that is fitted with audio processing capabilities. Another example is a network telephone that has been designed with a network adapter to enable the telephone to be directly connected to the data network. Network telephones provide the familiar interface that users typically associate with telephones, but with the feature that communications can occur over a packet-based data network rather than a circuit-switched network.

With a network telephone, telephone numbers of callees are typically entered through the keypad, by activating a speed-dial button, or by selecting an entry from a telephone directory that is displayable in a display of the network telephone. With a computer system having audio processing capabilities, a more sophisticated graphical user interface is typically provided due to the larger screen size of the computer system. Telephone directories are displayed, with entries selected for dialing the telephone numbers of the callees.

Although many improvements have been made to make the process of dialing a telephone number more convenient, such as speed-dial buttons or selecting entries from a telephone directory, such features are still associated with various shortcomings. For example, a speed-dial button is programmed only on the individual telephone, and typically cannot be shared with other telephony devices. A telephone directory, such as an address book, is typically stored in a predetermined format set by the application program that created the directory. Typically, the telephone directory cannot easily be shared with other application programs.

SUMMARY

In general, according to one embodiment, a method of making a call comprises displaying a hyperlink, receiving an indication of user selection of the hyperlink, and generating a call request based on the indication.

Some embodiments of the invention may have one or more of the following advantages. A convenient mechanism is provided for the user to make calls over various networks. Hyperlinks can be easily shared between different application programs and users. For example, a hyperlink stored by one application program, such as a web browser, may be accessible for copying to another application program, such as a telephone directory.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
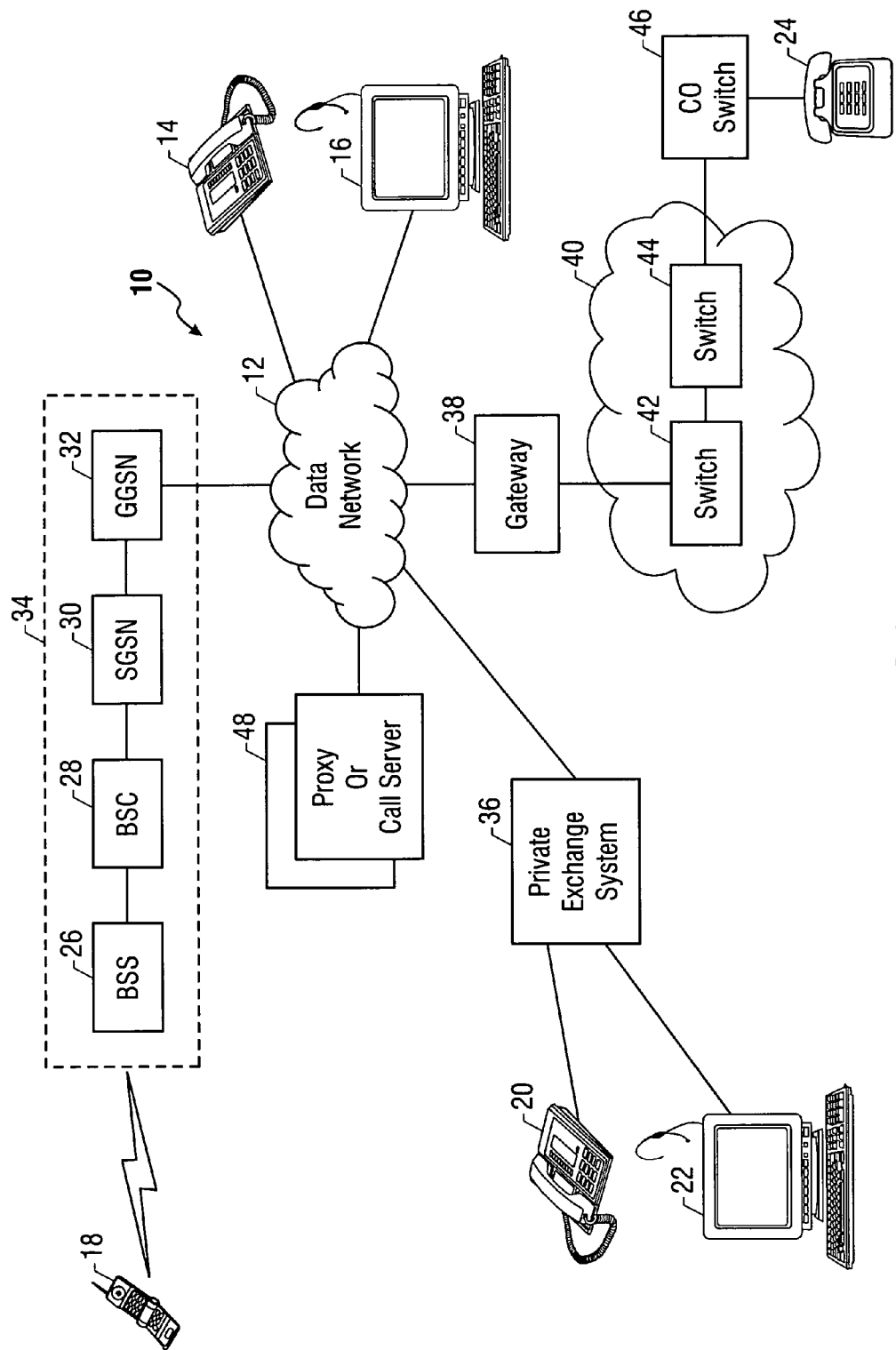
FIG. 1 is a block diagram of an embodiment of a communications system.

Referring to FIG. 1, a communications system 10 includes a data network 12 that is coupled to various network elements. Examples of network elements include terminals that can be connected to the data network 12, such as a network telephone 14 and a computer 16. A network telephone 14 is a telephone that includes a network adapter to enable it to communicate with the data network 12. An example of such a network telephone is the i2004 telephone from Nortel Networks. The computer 16 is fitted with audio processing capabilities to enable voice communications over the data network 12 with another terminal.

The data network 12 may also be coupled to a private exchange system 36, such as a private branch exchange (PBX) system, a key telephone system, and the like. The private exchange system 36 is connected to various terminals, such as a telephone 20 and a computer system 22. The private exchange system 36 has a first type interface for connecting to the data network 12 and a second type interface for connecting to the telephone 20. The second type interface may be a line interface between the private exchange system 36 and the telephone 20. The interface between the private exchange system 36 and the computer system 22 may be a packet-based interface similar to the first type interface.

Another network element that is connected to the data network 12 is a wireless or cellular infrastructure 34 that enables data communications between a wireless or mobile terminal 18 and the data network 12. In one example embodiment, the wireless infrastructure 34 includes a base station system (BSS) 26 that is capable of radio frequency (RF) communications with the wireless terminal 18. The BSS 26 is connected to a base station controller 28, which is in turn connected to a serving GPRS support node 30. GPRS stands for General Packet Radio Service (GPRS), which is a packet-based wireless protocol to provide efficient connections between a wireless unit and a packet-based data network. Enhancements GPRS include the Enhanced GPRS (EGPRS) technology (also referred to as Enhanced Data Rate For Global Evolution or EDGE) and the EGPRS COMPACT technology (or EDGE COMPACT), which are set by the European Telecommunications Standards Institute (ETSI). The SGSN 30 controls the establishment, management, and termination of packet-based communications between the wireless terminal 18 and the data network 12. The SGSN 30 is coupled to the data network 12 through a gateway GPRS support node (GGSN) 32, which acts as an interface between the SGSN 30 and the data network 12.

The wireless infrastructure 34 shown is provided merely as an example of how communications can occur between a wireless device and a packet-based data network. Other arrangements are possible in further embodiments.

The data network 12 may also be connected to a gateway 38, which converts or translates the format of control and bearer traffic between the packet-based data network 12 and a circuit-switched network such as a public switched telephone network (PSTN) 40. The PSTN 40 is associated with various switches, such as switch 42 and 44, to provide circuit connections between the gateway 38 and a central office (CO) switch 46. The switches 42 and 44 may be tandem switches. Telephone devices 24 are connected to the CO switch 46. In a communication between the telephone 24 and a terminal connected to data network 12, the gateway 36 converts circuit-switched control and bearer traffic signaling into packet-based control and bearer traffic signaling, and vice versa.

As used here, "data network" or "network" refers to one or more communications networks, channels, links, or paths, and routers or switches used to route data over such networks, channels, links, or paths. The data network 12 may be a packet-based data network, such as an Internet Protocol (IP) network. An IP network is a connectionless, packet-switched network. Packets communicated over an IP network may travel independently over any path (and possibly over different paths) to a destination point. The packets may even arrive out of order, with routing of the packets based on one or more addresses carried in each packet. Another type of packet-based data network is a connection-oriented network, such as an Asynchronous Transfer Mode (ATM) or Frame Relay network.

To route call requests, or to make call requests on behalf of other devices on the data network 12, one or more proxies or call servers 48 are coupled to the data network 12. Typically, a call request from any one of the network elements is received by the proxy or call server 48, which then generates another call request targeted to the destination network element or to another proxy or call server.

Some of the terminals illustrated in FIG. 1 are capable of presenting information in respective displays, such as terminals 14, 16, 18, and 22. In accordance with some embodiments, hyperlinks can be presented in the displays of such terminals, with such hyperlinks selectable by a user to make calls over the data network 12.

As used here, "hyperlink" refers to an element that contains a label (presentable in a display) and associated link information, such as a uniform resource locator (URL), that causes a link to be established with another object, which can be a file or document, a portion of a file or document, or any other resource (whether located in the device in which the hyperlink is presented or in a remote device). Hyperlinks are typically defined in documents, sometimes referred to as hypertext documents, that also provide for the display of various types of information. For example, hypertext documents may define web pages that can be displayed in a browser window, with the web pages containing labels of hyperlinks that are selectable by users to link to other resources. In accordance with some embodiments, one such resource includes programs that can establish call sessions over the data network 12 or other networks, including the wireless network provided by the wireless infrastructure 34 and the PSTN 40.

Figure 2:
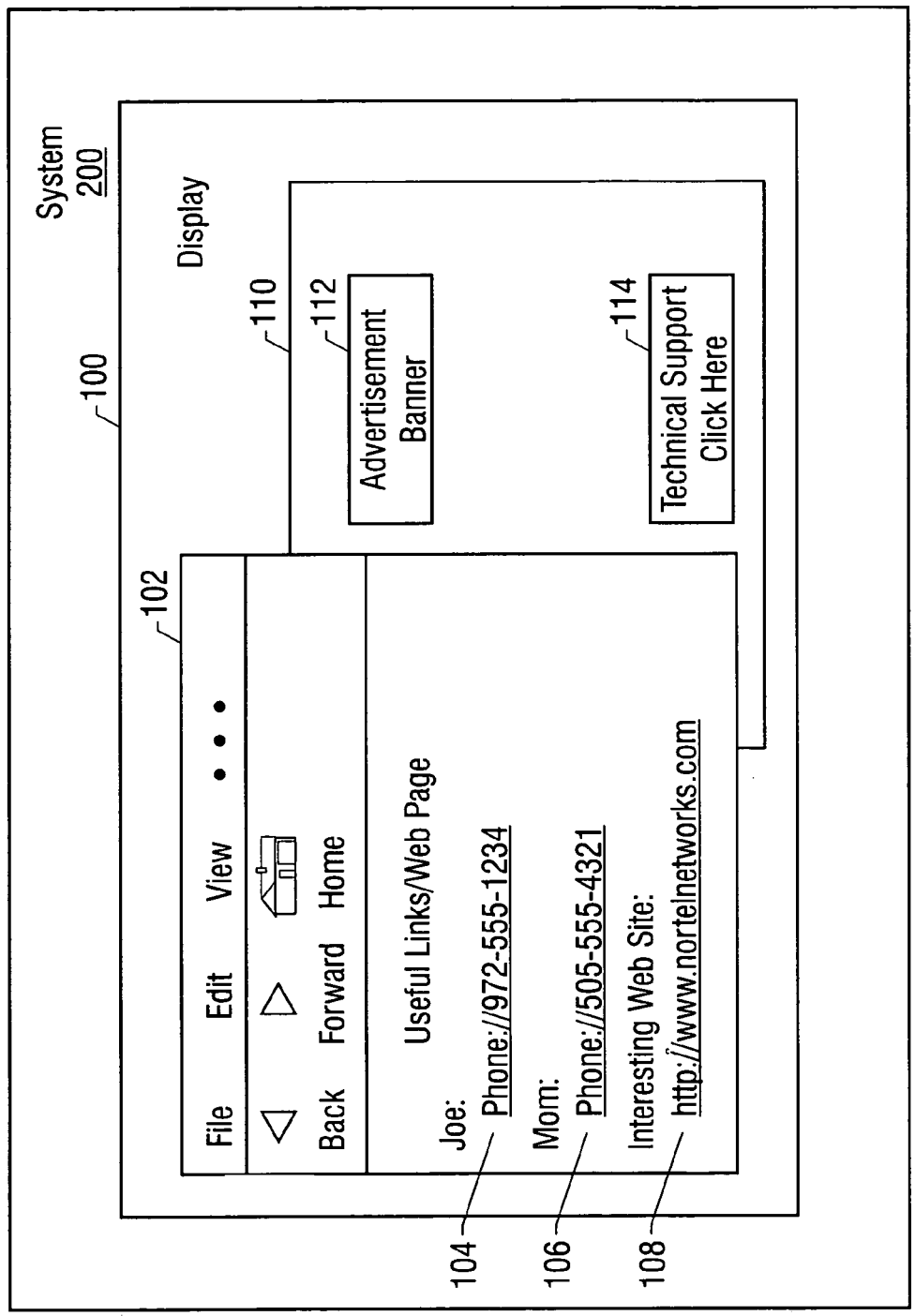
FIG. 2 illustrates a display and hyperlinks displayable in the display, in accordance with an embodiment.

Referring to FIG. 2, an example screen 102 that can be displayed on a display 100 in a system 200 contains various hyperlinks, including a first hyperlink 104 associated with Joe, a second hyperlink 106 associated with Mom, and a third hyperlink 108 that points to an interesting web site. Selection of hyperlinks 104 and 106 causes corresponding telephone numbers to be dialed by a call application routine in the system 200. Selection of the hyperlink 108 causes the system 200 to retrieve the web page identified by the hyperlink 108, with the web page displayed in the screen 102 or in another screen of the display 100.

Although the displayed labels of the hyperlinks 104 and 106 contains the URL (including the telephone number) of the callee, other types of labels may be employed. For example, the labels of the hyperlink 104 and 106 may be the full name of the party, a graphic image (e.g., a picture or logo), or just the telephone number.

The hyperlinks 104 and 106 point to telephone numbers to be used for establishing call sessions, while the hyperlink 108 points to a web site, e.g., www.nortelnetworks.com. Each of the hyperlinks 104, 106, and 108 is associated with a URL. Some forms of URLs are described in Request for Comments (RFC) 1738, dated December 1994. In general, a URL has the following format:

<scheme>:<scheme-specific-part>.

A URL contains the name of the scheme (or protocol identifier) being used (<scheme>) followed by a string (<scheme-specific-part>), whose interpretation depends on the scheme. Example schemes include a File Transfer Protocol (FTP) scheme, a Hypertext Transfer Protocol (HTTP) scheme, an electronic mail address (MAILTO) scheme, and other schemes. Thus, as shown in FIG. 2, the scheme for the URL corresponding to the hyperlink 108 is the HTTP scheme.

For the hyperlinks 104 and 106, a new scheme PHONE may be defined. Thus, under the PHONE scheme, a URL may specify a telephone number or other logical identifier that a terminal may use to establish a call over the data network 12. The PHONE scheme is provided only as an example, as other schemes may be employed.

As further shown in another screen 110, the hyperlinks may come in other forms. For example, the hyperlink may be in the form of an advertisement banner 112, which can be displayed in a web page to enable a user to make a call to inquire about the advertised good or service. In addition, as another example, a hyperlink 114 is titled "Technical Support, Click Here" to enable a user to make a call to technical support personnel in case help is needed.

Figure 3:
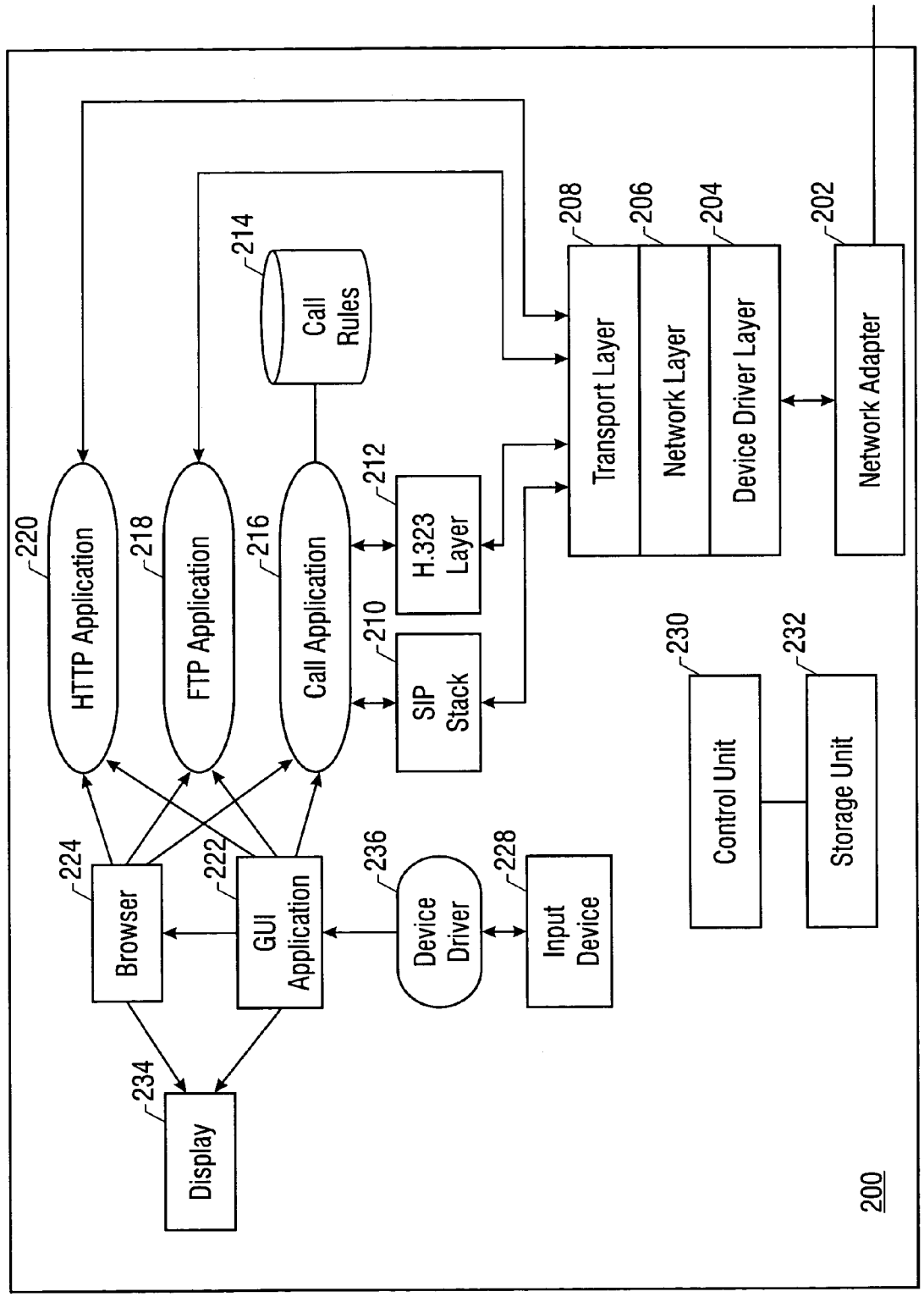
FIG. 3 is a block diagram of components in a terminal used in the communications system of FIG. 1, in accordance with an embodiment.

Referring to FIG. 3, a terminal 200 that can be used for voice or other types of streaming communications over the data network 12 is illustrated. The terminal 200 may be any one of the terminals 14, 16, or 22 shown in FIG. 1.

The terminal 200 includes a network adapter 202 that provides an interface to a data network. The network adapter 202 communicates with software layers of the terminal through a device driver layer 204, a network layer 206, and a transport layer 208. An example network layer 206 is an Internet Protocol (IP) layer that provides for packet-switched communications over the data network. One version of IP is described in RFC 791, entitled "Internet Protocol," dated September 1981. Another version of IP is IPv6, described in RFC 2460, entitled "Internet Protocol, Version 6 (IPv6) Specification," dated December 1998. An example transport layer 208 is a User Datagram Protocol (UDP) layer. UDP is described in RFC 768, entitled "User Datagram Protocol," dated August 1980. The UDP layer 208 manages connections between network elements over an IP network.

In addition to the network and transport layers, a layer may be provided in the terminal 200 that controls the generation and parsing of call requests over the data network 12. One such layer may be a Session Initiation Protocol (SIP) stack 210 that generates (for outbound call requests) or parses (for inbound call requests) SIP messages. The SIP messages may be messages inviting a terminal to participate in a call session as well as various response messages indicating various stages of the process of a call session setup. A version of SIP is described in RFC 2543, entitled "SIP: Session Initiation Protocol," dated August 1999.

In an alternative embodiment, instead of a SIP stack 210, an H.323 layer 212 may be provided in the terminal 200. The H.323 Recommendation, from the International Telecommunication Union (ITU), also provides for call session setup and termination over data networks. Thus, whereas the SIP stack 210 communicates SIP messages, the H.323 layer 212 communicates H.323 messages.

Once a call session is established by either the SIP stack 210 or the H.323 layer 212, a media path is established between two terminals involved in the call session. One protocol that provides for the exchange of media through the defined path is a Real-Time Protocol (RTP), as described in RFC 1889, entitled "RTP: A Transport Protocol for Real-Time Applications," dated January 1996. The components for handling the RTP media as well as for presenting audio information and receiving audio from a user interface of the terminal 200 are not shown.

Control signaling are communicated between the SIP stack 210 or the H.323 layer 212 and a call application routine 216. The call application 216 is responsible for generating or processing requests for call sessions over the data network. Another task performed by the call application routine 216, as described below, is the ability to generate call requests in response to selection of hyperlinks presented in a display 234 of the terminal 200.

The terminal 200 includes several application routines, including an HTTP application 220 for communicating HTTP requests over the data network 12, an FTP application 218 for communicating FTP requests over the data network 12, and the call application 216 for communicating call requests over the data network 12. The HTTP, FTP, and call applications 220, 218, and 216 are capable of communicating with a browser 224 (e.g., the Navigator browser from Netscape or the Internet Explorer browser from Microsoft) or with a graphical user interface (GUI) application 222. Both the browser 224 and GUI application 222 are capable of presenting information in the display 234. For example, the browser 224 can display a web page or other screens containing hyperlinks that can be used for making calls over the data network. The GUI application 222 has similar capabilities.

As illustrated, an input device 228 (e.g., a mouse or other pointer device, a keyboard, and the like) may be used by a user to select items (such as hyperlinks) in the display 234. The selections made by the input device 228 are communicated through a device driver 226 to the browser 224 or the GUI application 222.

Thus, in operation, a hyperlink (such as the hyperlinks in FIG. 2) may be displayed in the display 234. When a selection of a hyperlink is made by the user with the input device 228, the browser 224 or the GUI application 222 receives the selection and communicates the selection to the appropriate one of the HTTP, FTP, and call applications 220, 218, and 216. For example, if a hyperlink is associated with an HTTP URL, then the HTTP application 220 sends the appropriate request over the data network 12 for the requested information (e.g., a web page). Similarly, if the displayed hyperlink is associated with an FTP URL, then the FTP application 218 sends the appropriate request over the data network. If the displayed hyperlink is associated with a PHONE URL, then the call application 216 makes a call request over the data network.

The call application 216, upon receiving a URL associated with the selected hyperlink, accesses a call rules file 214 to determine how the call can be made and what additional information is needed for the selected URL. For example, the call application 216 can use the call rules file 214 to determine if the call is a local or a long distance call. For a local call, the call application 216 uses the call rules to determine if the area code is needed in the dialed number (7-digit versus 10-digit dialing). If the call is long distance, the call application 216 determines what prefix to use (e.g., 1-, or 011-). Other information may be associated with the URL, such as special characters to disable call waiting and to insert pauses. Other characters include private exchange system codes, extra digits to navigate automated attendant systems, and so forth. A further example of the additional information includes calling card information or other charge information that is appended to the dialed number so that the appropriate calling card or other charge information may be billed.

Figure 4:
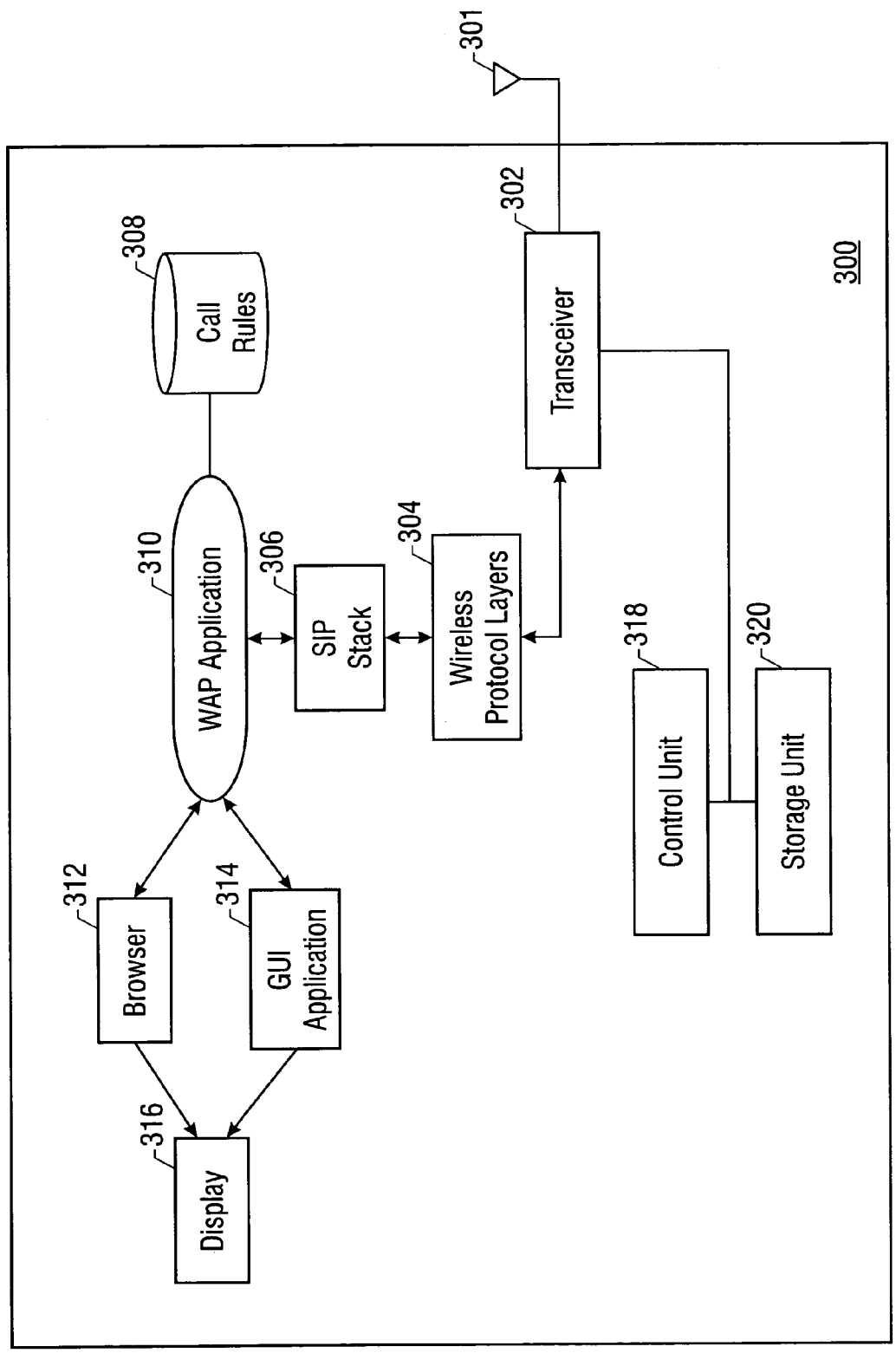
FIG. 4 is a block diagram of components in a mobile or wireless terminal used in the communications system of FIG. 1, in accordance with another embodiment.

Referring to FIG. 4, another type of terminal 300 is illustrated. The terminal 300 is a wireless device, such as the wireless device 18 shown in FIG. 1. The terminal 300 includes an RF transceiver 302 that is connected to an antenna 301 for communicating (transmitting and receiving) RF signals. The transceiver 302 is connected through various wireless protocol layers 304 to a SIP stack 306 (or to another type of call stack). A WAP (Wireless Application Protocol) application routine 310 is provided in the terminal 300 to perform data communications over the data network 12. The WAP application routine 310 can perform traditional data communications, such as web browsing, electronic mail, and the like, as well as issue call requests through the SIP stack 306. WAP is provided by the Wireless Application Protocol Forum, Ltd., and is described in the Wireless Application Protocol Architecture Specification, dated Apr. 30, 1998. WAP specifies an application framework and network protocols for wireless devices.

The WAP Architecture defines a protocol stack that includes an Application Layer (WAE), a Session Layer (WSP), a Transaction Layer (WTP), a Security Layer (WTLS) and a Transport Layer (WDP). The WAE layer is a general purpose application environment that provides for a micro-browser supporting a Wireless Markup Language (WML), which is a lightweight markup language that is similar to HTML but is optimized for use in hand-held mobile terminals. The micro-browser environment also supports a WML scripting language that is a lightweight scripting language similar to the JAVA scripting language. The WAP protocols are designed to operate over a variety of different bearer services, including short messaging, circuit-switched data, and packet data.

The WAP application routine 310 communicates with a browser 312 or a GUI application 314, which controls the presentation of information in a display 316. As in the terminal 200 of FIG. 3, the browser 312 or GUI application 314 is able to present hyperlinks in the display 316 that are selectable by a user to make calls over the data network 12. An indication that a hyperlink has been selected is communicated to the WAP application routine 310, which accesses a call rules file 308 to determine how the call is to be made and the types of additional information to append to the telephone number and other identifier.

In the terminals 200 and 300, various software routines or modules are executable on respective control units 230 and 318, with instructions and data associated with the software routines or modules contained in respective storage units 232 and 320.

Figure 5:
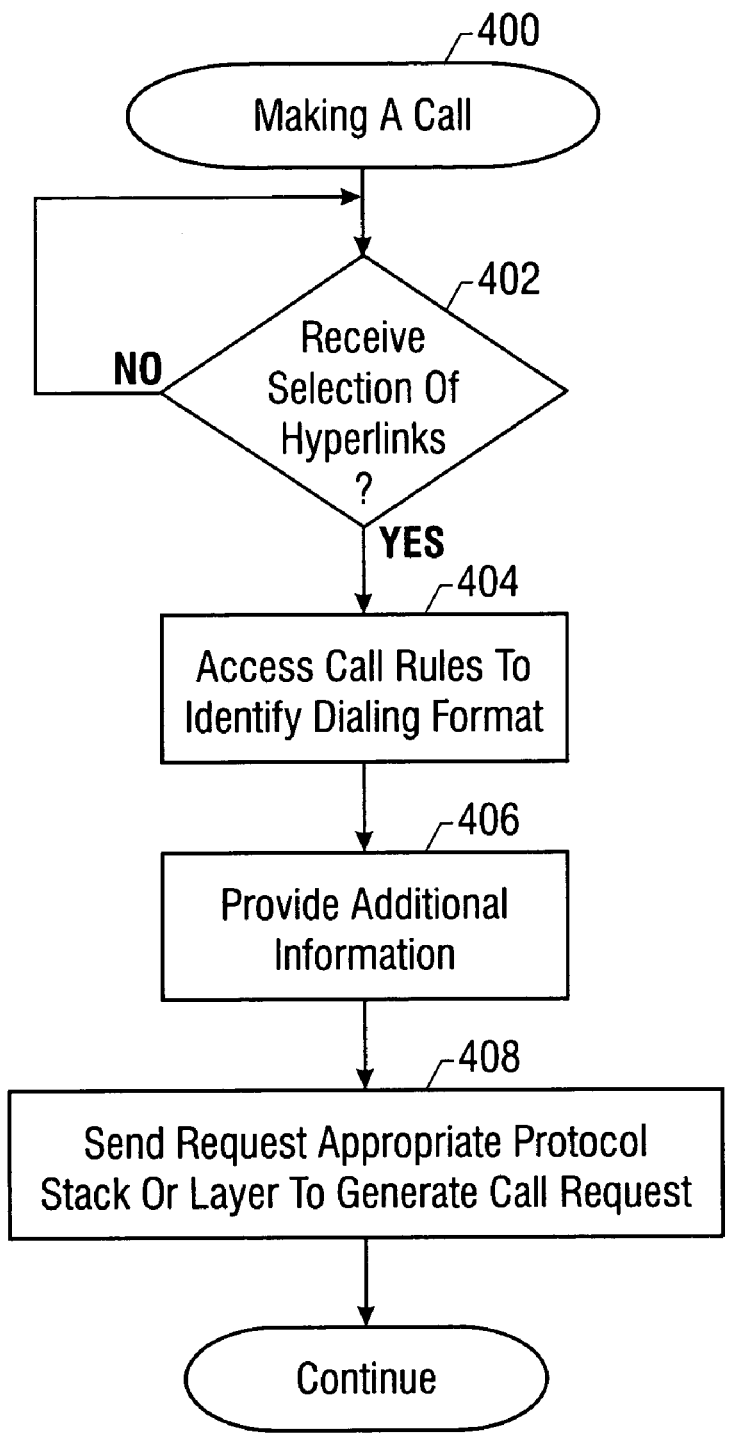
FIG. 5 is a flow diagram for making a call, in accordance with an embodiment.

Referring to FIG. 5, a process of making a call in accordance with an embodiment is illustrated. First, a call processing routine (routine 216 in FIG. 3 or routine 310 in FIG. 4) determines if selection of a hyperlink has been received (at 402). If so, the call processing routine receives the associated URL and accesses (at 404) the call rules file (214 in FIG. 3 and 308 in FIG. 4) to identify the dialing format for the call request. As noted above, the URL can be a telephone number or other logical identifier. In addition, the call processing routine determines (at 406) if additional information (such as charge information or other extension) is to be added to the call request. Next, the communicates (at 408) a request to the appropriate protocol stack or layer (e.g., SIP stack or H.323 layer) to generate a call request (SIP request or H.323 request) that is transmitted over the data network 12.

Figure 6:
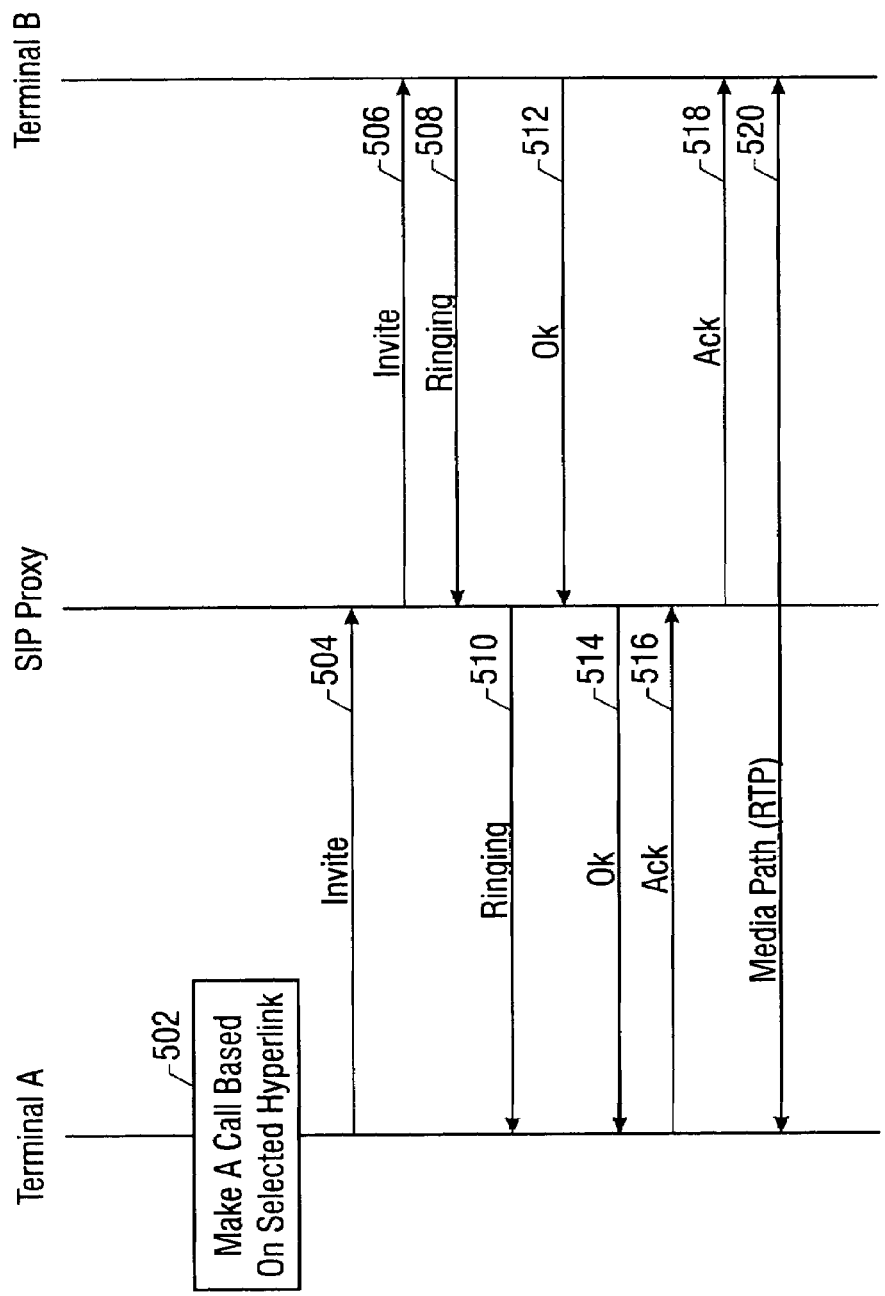
FIG. 6 is a message flow diagram illustrating establishment of a call session between two terminals, in accordance with an embodiment.

Referring to FIG. 6, a message flow diagram for establishing a call over the data network 12 is illustrated. The originating terminal is terminal A and the destination terminal is terminal B. In the example flow, a SIP proxy acts as an intermediary between terminals A and B. In response to the request to make a call (at 502) generated due to selection of a hyperlink, as described in connection with FIG. 5, terminal A sends a SIP INVITE message (at 504), which contains the logical identifier of the destination terminal B. The logical identifier can be a telephone number, an e-mail address, a SIP address, an IP address, and so forth. Upon receipt of the INVITE request, the SIP proxy determines the location of the destination device (terminal B) and communicates an INVITE request (at 506) to terminal B. In response to the INVITE request, terminal B returns a SIP RINGING response (at 508) to indicate that an attempt is being made to locate the destination party. Upon receiving the RINGING response, the SIP proxy communicates the RINGING response (at 510) to terminal A.

Upon acceptance of the call request, terminal B issues a SIP OK response (at 512) that is communicated to the SIP proxy, which in turn transmits an OK (at 514) to terminal A. Upon receipt of the OK response 514, terminal A generates a SIP ACK request (at 516) that is communicated through the SIP proxy as an ACK request (at 518) to terminal B.

Upon receiving the ACK request (at 518), a media path is established between terminals A and B. This media path can communicate bearer traffic (e.g., voice data) using a predetermined protocol, such as the Real-Time Protocol (RTP).

Figure 7:
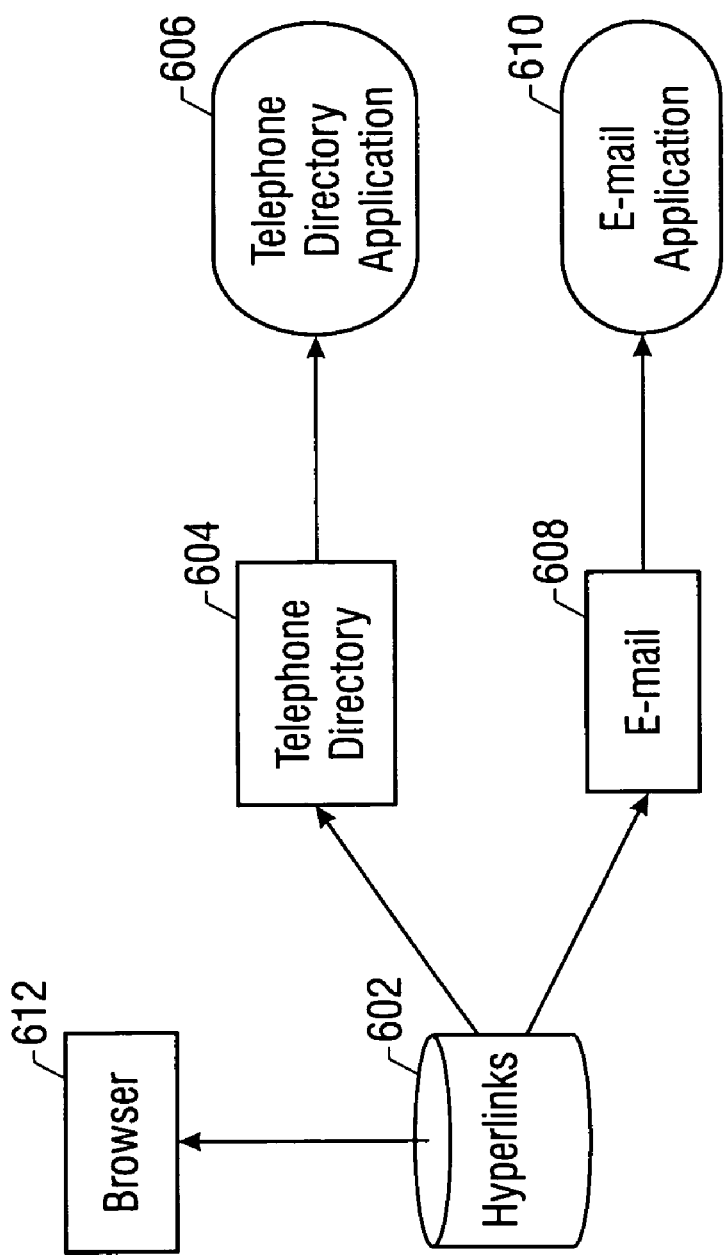
FIG. 7 illustrates the sharing of hyperlinks between application programs.

Referring to FIG. 7, in accordance with another aspect of some embodiments of the invention, the hyperlinks 602, which are typically defined in documents (e.g., hypertext documents), may be conveniently copied to various application programs in each terminal. One example format of the hypertext document is HTML (Hypertext Markup Language) or WML (WAP Markup Language). Other formats are also possible, such as the Extensible Markup Language (XML). More generally, the hypertext documents, and the hyperlinks in the hypertext documents, are defined by a common "hyper-language" or "network-based language," such as the ones listed above. The common "hyper-language" or "network-based language" may be any language used for defining documents, files, or resources that can be communicated over a network (e.g., Internet, local area network or LAN, wide area network or WAN, etc.).

A hyperlink 602, typically presented in a display by a browser 612, may be copied to a telephone directory 604 that is managed by a telephone directory application routine 606. Similarly, a hyperlink 602 may be copied to an electronic mail message 608 that is being created by a user through an e-mail application routines 610. The hyperlinks may be similarly copied to other types of applications, making sharing of the hyperlinks easy because of the common format that is easily understood by various different application programs, including browsers, in each terminal. The hyperlinks can also be easily communicated over a network, making sharing convenient. Thus, for example, instead of orally telling another user a telephony number of a party, the hyperlink pointing to the URL containing the telephone number or other logical identifiers of the party may be communicated in an e-mail message, text chat message, or copied from a web page.

The various software layers, routines, or modules discussed herein may be executable on control units in corresponding terminals. Instructions of such software layers, routines, or modules may be stored on one or more storage units in the various terminals. A control unit may include a microprocessor, a microcontroller, a processor card (including one or more microprocessors or microcontrollers), or other control or computing devices. As used here, a "controller" refers to hardware, software, or a combination thereof.

The storage units may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or programs in various terminals and stored in respective storage units when executed by a respective control unit cause the corresponding terminal to perform programmed acts.

The instructions of the software routines or programs may be loaded or transported into the terminal in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireless links, cables, and the like) may communicate the code segments, including instructions, to the terminal. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of making a call, comprising:

displaying, in a display of a terminal, a hyperlink, wherein the hyperlink is associated with a logical identifier;

accessing rules information to determine further information to add to the logical identifier, the further information to enable at least one of disabling call waiting, inserting a pause, and navigating an automated call attendant;

receiving, by the terminal, an indication of user selection of the hyperlink;

generating, by the terminal, a call request for establishing a call session over a packet-based network based on the indication;

sending, by the terminal, the call request over the packet-based network;

communicating, by the terminal, voice data over the packet-based network in the call session, wherein communicating the voice data over the packet-based network comprises communicating the voice data over an Internet Protocol network.

2. The method of claim 1, wherein displaying the hyperlink is performed in a browser screen.

3. The method of claim 1, further comprising associating the hyperlink with a telephone number of a remote party.

4. The method of claim 1, further comprising determining if the call session is local or long distance and adding prefix information if the call session is determined to be long distance.

5. The method of claim 1, further comprising copying the hyperlink from a first storage location accessible by a browser to a second storage location accessible by another application routine.

6. The method of claim 1, wherein establishing the call session comprises establishing a call session with a remote terminal.

7. The method of claim 1, wherein sending the call request comprises sending, by the terminal, a Session Initiation Protocol call request over the packet-based network.

8. A device capable of participating in call sessions over a data network, comprising:

a display;

a hyperlink presentable in the display and selectable by a user;

a controller to generate a call request in response to selection of the hyperlink; and a storage device containing call rules, the controller to access the call rules to determine how the call request is to be generated, the controller to add one or more special characters to provide a function based on the call rules, wherein the function is selected from the group consisting of disabling call waiting, inserting a pause, and navigating an automated attendant.

* * * * *